United States Patent [19]
Verville

[11] Patent Number: 5,232,738
[45] Date of Patent: Aug. 3, 1993

[54] PROCESS FOR REMOVABLY FIXING OPTICAL FIBERS

[75] Inventor: Thomas J. Verville, Tucson, Ariz.

[73] Assignee: Hughes Aircraft Company, Los Angeles, Calif.

[21] Appl. No.: 644,167

[22] Filed: Jan. 22, 1991

Related U.S. Application Data

[63] Continuation of Ser. No. 275,291, Nov. 23, 1988, abandoned.

[51] Int. Cl.[5] .............................................. B05D 5/06
[52] U.S. Cl. .................................... 427/163; 427/178; 427/207.1; 427/434.2; 427/434.7
[58] Field of Search ............ 427/166, 163, 168, 434.2, 427/204.4, 434.7, 208.8, 207.1; 242/173, 177, 18 R, 47, 159, 174, 176

[56] References Cited

U.S. PATENT DOCUMENTS 4,746,080  5/1988  Pinson ................................ 242/177

FOREIGN PATENT DOCUMENTS 2182360  5/1987  United Kingdom .

OTHER PUBLICATIONS

Patent Abstracts of Japan, vol. 8, No. 208 (P-302), 21 Sep. 1984 and JP, A, 59091465 (K.S. Kogyo) 26 May 1984.

Primary Examiner—Bernard Pianalto
Attorney, Agent, or Firm—C. D. Brown; R. M. Heald; W. K. Denson-Low

[57] ABSTRACT

Optical fibers are removably held in place on a payout bobbin using a silicone-based adhesive. The adhesive in a liquid carrier is applied to the optical fibers as they are wound onto the payout bobbin, and holds the fibers in place during the winding of subsequent turns. The fiber is readily unwound from the bobbin during payout without disruption of adjacent turns or layers, even after long-term storage. The preferred adhesive has about 5 percent by weight of a mixture of 25 percent by weight of a fluorosilicone and 75 percent by weight of a polydimethylsiloxane, and is carried for deposition in 95 percent by weight/volume of a liquid carrier selected from the group consisting of 1,1,2-trichloro-1,2,2-trifluoroethane, 1,1,1-trichloroethane, and mixtures thereof.

11 Claims, 2 Drawing Sheets

PROCESS FOR REMOVABLY FIXING OPTICAL FIBERS

This is a continuation of application Ser. No. 07/275,291 filed Nov. 23, 1988 now abandoned.

BACKGROUND OF THE INVENTION

This invention relates to the use of optical fibers, and, more particularly, to an adhesive that is used in removably fixing optical fibers onto a payout bobbin in forming a canister.

Optical fibers are strands of glass fiber processed so that light beams transmitted therethrough are subject to total internal reflection. A large fraction of the incident intensity of light directed into the fiber is received at the other end of the fiber, even though the fiber may be hundreds of meters long. Optical fibers have shown great promise in communications applications, because a high density of information may be carried along the fiber and because the quality of the signal is less subject to external interferences of various types than are electrical signals carried on metallic wires. Moreover, the glass fibers are light in weight and made from a highly plentiful substance, silicon dioxide.

Glass fibers are typically fabricated by preparing a preform of glasses of two different optical indices of refraction, one inside the other, or a single glass composition with a coating that ensures total internal reflection, and then processing the preform to a fiber by drawing, extruding, or other process. The optical fiber is then coated with a polymer layer termed a buffer to protect the glass from scratching or other damage. As an example of the dimensions, in a typical configuration the diameter of the glass optical fiber is about 125 micrometers, and the diameter of the fiber plus the polymer buffer is about 250 micrometers.

For such very fine fibers, the handling of the optical fiber to avoid damage that might reduce its light transmission properties becomes an important consideration. The fibers are typically wound onto a cylindrical or tapered cylindrical bobbin with many turns adjacent to each other in a side by side fashion. After one layer is complete, another layer of fiber is laid on top of the first layer, and so on. The final assembly of the bobbin and the wound layers of fiber is termed a canister. At a later time when the optical fiber is to be used, the fiber is ordinarily paid out from the canister in an unwinding operation.

It has been found by experience that, where the fiber is to be paid out from the canister in a rapid fashion, the turns of optical fiber must be held in place on the canister with an adhesive. The adhesive holds each turn of fiber in place as adjacent turns and layers are initially wound onto the canister, and also as adjacent turns and layers are paid out. Without the use of an adhesive, payout of the fibers may not be uniform and regular, leading to snarls or snags of the fibers that damage them or cause them to break as they are paid out.

The currently used optical fiber adhesive is a neoprene adhesive that is applied to the turns of optical fiber in a discontinuous fashion. That is, after a layer is wound onto the canister, the winding operation is stopped, and the adhesive is sprayed onto the layer. After a brief pause to permit the adhesive to dry, the next layer is wound overlying the layer to which the adhesive was applied. The discontinuous winding operation slows the production of wound fiber optical canisters. There is reason to believe that the neoprene adhesive application process induces surface changes to the optical fiber that increases the optical loss from the fiber during subsequent use. The optical loss is a serious drawback of the neoprene adhesive. The relatively high glass transition temperature of the neoprene adhesive causes it to become brittle when cooled, leading to possible cracking of the adhesive that can cause difficulties during fiber payout. The neoprene can oxidize during elevated temperature exposure, also leading to brittleness.

There is a need for an improved adhesive for use in optical fiber winding and payout operations. Such adhesive should have the necessary mechanical properties to ensure a uniformly wound canister, should not cause damage to the light transmission properties of the optical fiber, and should promote uniform payout of the optical fiber even after prolonged storage at extreme temperatures. The present invention fulfills this need, and further provides related advantages.

SUMMARY OF THE INVENTION

The present invention provides an adhesive and application process for use in releasably fixing optical fibers onto a storage container. The adhesive is sufficiently tacky to hold the fibers in place, minimizing winding defects that otherwise arise, particularly at the transition between layers. The adhesive exhibits sufficient lubricity to minimize the need for mechanically rearranging the fibers to achieve a smooth wound array. The adhesive permits the fibers to be readily paid out, at low or high speeds, from the container. The adhesive does not lose its beneficial properties under prolonged aging, even in extreme temperatures, so that the payout characteristics are retained over long periods of storage of the wound container.

In accordance with the invention, a process for removably fixing optical fibers onto a payout support comprises the steps of applying an optical fiber onto a payout support; and depositing over the optical fiber an adhesive selected from the group consisting of a fluorosilicone, a polydimethylsiloxane, and mixtures thereof, in a liquid carrier.

In a preferred embodiment, a process for removably fixing optical fibers onto a tapered cylindrical payout support comprises the steps of winding an optical fiber onto a tapered cylindrical payout support; and depositing over the optical fiber a mixture consisting essentially of about 5 percent by weight of an adhesive having about 25 percent by weight of 3,3,3-trifluoropropylmethylsiloxane and about 75 percent by weight of polydimethylsiloxane, and about 95 percent by weight/volume of a carrier selected from the group consisting of 1,1,2-trichloro-1,2,2-trifluoroethane, 1,1,1-trichloroethane, and mixtures thereof, the step of depositing being conducted simultaneously with the step of winding.

At the time the optical fiber is produced, or at a later time, it is wound onto a cylindrical or tapered cylindrical support from which it is later paid out during use. The adhesive is applied over the optical fiber on the support, preferably by pressure-less die application of the adhesive in a liquid carrier, concurrently with the winding operation. The application of the adhesive can optionally be accomplished by spraying, brushing, or other suitable technique, and may be deferred to the end of the winding of each layer, the prior approach, but that is not required as in the prior approach. The present adhesive permits the application at the same time as the winding operation, which speeds the winding operation.

After the adhesive and the carrier have been applied, the mixture exhibits a useful combination of lubricity and tackiness. As the fibers are wound onto the support, there can normally be small misalignments so that each turn does not deposit perfectly evenly adjacent the prior turn, and each layer is not perfectly placed over the preceding layer. The lubricity of the adhesive allows the turns and layers to slip over each other a small amount, to adjust the packing of the fibers to an even array. Previously, a step called "massaging" was employed to achieve this result, the massaging being a manual manipulation of the layers with a tool to cause the fibers to pack together evenly. The present adhesive permits the massaging step to be reduced significantly, as the lubricity of the adhesive aids the fibers in adjusting to their correct positions in the fiber pack.

The adhesive is somewhat tacky to the touch, which aids in achieving a smooth payout and a smooth, stable transition between layers. The adhesive does not become brittle under normal low- or high-temperature exposure and aging, so that payout is smooth even after prolonged storage of the canister. With the prior neoprene adhesive, there was an increased tendency for the turns at the end of each layer to become slightly unwound in the transition or step-back region, which could cause snags and snarls when the fiber was paid out. Also, the methylethylketone solvent used for neoprene adhesives has been found to degrade the polymer coating present as a protective layer on the optical fibers, leading to possible reduction in light transmission.

The present invention also extends to the adherent mixture of adhesive and carrier itself. In accordance with that aspect of the invention, an optical fiber adherent material consists essentially of an adhesive selected from the group consisting of a fluorosilicone, a polydimethylsiloxane, and mixtures thereof, the adhesive being supported in a carrier liquid. In a preferred embodiment, an optical fiber adherent material, consists essentially of about 5 percent by weight of a mixture of about 25 percent by weight of 3,3,3-trifluoropropylmethylsiloxane and about 75 percent by weight/volume of polydimethylsiloxane; and about 95 percent by weight of a liquid carrier selected from the group consisting of 1,1,2-trichloro-1,2,2-trifluoroethane and 1,1,1-trichloroethane, and mixtures thereof.

The adhesive/solvent system is selected to provide the combination of lubricity and tackiness referred to previously. The solvent evaporates after the mixture is applied. Fiber arrays coated with the present silicone-based adhesive exhibit less optical loss than those using the prior neoprene adhesive, a highly significant benefit. The adhesive does not become brittle and crack after storage of the canister, so that payout of the optical fiber is without difficulty.

The present invention therefore provides an important advance in the art of the practical utilization of fiber optical systems. In many uses, the optical fiber is wound onto a support, and the present approach provides substantially better performance than heretofore available for such wound fiber optical material. Other features and advantages of the invention will be apparent from the following more detailed description of the preferred embodiment, taken in conjunction with the accompanying drawings, which illustrate, by way of example, the principles of the invention.

DETAILED DESCRIPTION OF THE PREFERRED EMBODIMENT

Figure 1:
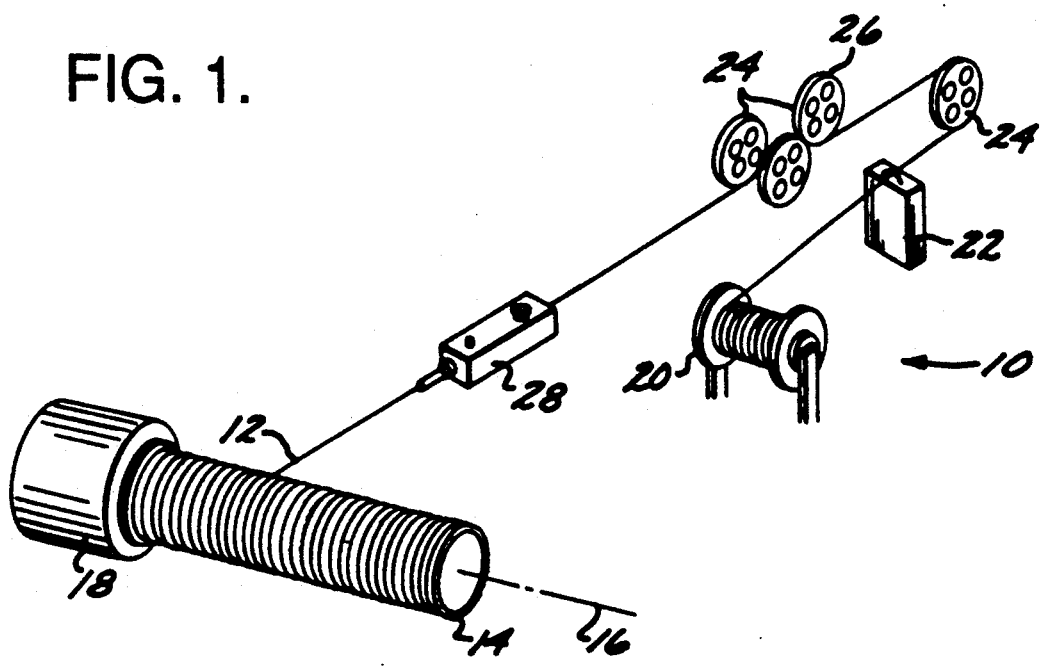
FIG. 1 is a schematic perspective view of an apparatus for winding an optical fiber onto a bobbin to form a canister, using the approach of the invention.

A winding apparatus 10 for winding an optical fiber 12 onto a bobbin 14 is illustrated in FIG. 1. The bobbin 14 may be cylindrical, or may be a tapered cylinder that is tapered slightly from one end to the other, as by about 2 degrees of taper, with the bobbin 14 in either case having an axis 16 of the cylinder. The bobbin 14 is typically made of aluminum, with a winding of steel wire laid down overlying the aluminum to act as a guide for the laying down of the optical fiber 12. The bobbin 14 is mounted on a winding lathe 18 that rotates the bobbin 12 about the axis 16 in a controllable manner. Additionally, the winding lathe translates the bobbin 14 in the direction parallel to the axis 16, so that the optical fiber 12 may move along a constant line of travel as it is wound onto the bobbin 14. The lathe is geared so that the advance in each direction matches the turning rate, to permit the fiber to deposit uniformly, first upon the steel wire and thereafter upon the preceding layers of glass fiber.

The optical fiber 12 is initially supplied from a storage spool 20. As the fiber 12 is unwound from the spool 20, it passes through a guide 22 and thence over a set of rollers 24. The rollers 24 align the fiber 12. Additionally, at least one of the rollers is a tensioning roller 26, which is spring loaded. The tensioning roller 26 cooperates with the lathe 18 to apply a proper tension to the fiber 12 as it is wound onto the bobbin 14.

After it passes over the rollers 24 but before it reaches the bobbin 14, the glass fiber 12 passes through a pressure-less die applicator 28, wherein a layer of the adhesive in the carrier is applied evenly to the fiber 12. In the applicator 28, the fiber passes through a bath of the adhesive and carrier, whose composition is discussed subsequently, so that the layer of the liquid mixture is deposited upon the surface of the fiber 12.

Figure 2:
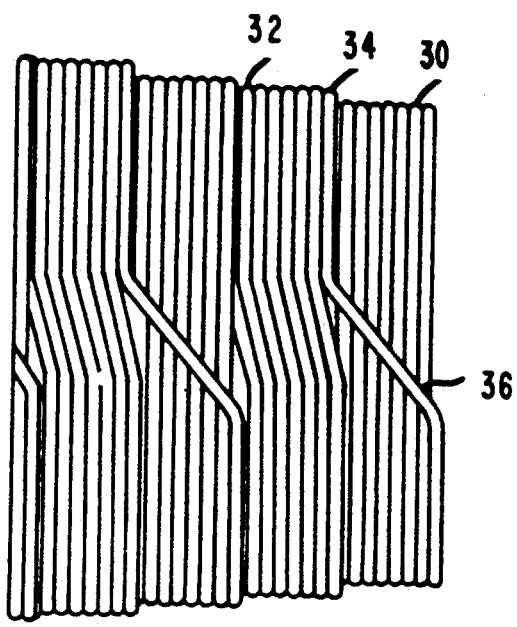
FIG. 2 is an elevational view of a detail of the canister of FIG. 1, illustrating a stable step-back between layers.

At the completion of winding each layer, the direction of movement of the bobbin 14 in the direction parallel to the cylindrical axis 16 is reversed, so that the next layer of fiber 12 can be deposited overlying the previously deposited layer. FIG. 2 illustrates the approach taken at the ends of layers. In the drawing, a first layer 30 is wound from left to right. At the completion of the first layer 30, the second layer 32 is wound from right to left overlying the first layer 30. The rightmost turn 34 of the second layer 32 does not commence exactly at the rightmost end of the first layer 30, but instead is set back by several turns. Such a set back approach in winding reduces the likelihood of snarls developing when the fiber 12 is later unwound from the bobbin 14. The optical fiber 12 therefore must execute a transition 36 from the rightmost end of the first layer 30 to the rightmost turn 34 of the second layer 32.

The ability to execute this transition is dependent upon the adhesive used on the fibers 12. If the adhesive is too weak or becomes weakened and brittle during storage, the transition portion 36 may become loosened, so that several turns pull loose or the transition "walks around" the diameter of the fiber pack to cause successive turns of fiber 12 to unravel on the bobbin 14. Either of these results can cause the optical fiber 12 to become snarled during payout.

Figure 3:
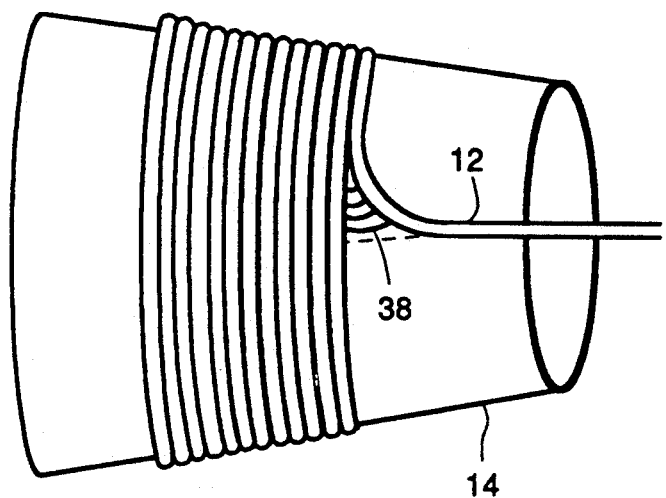
FIG. 3 is an enlarged perspective view of a partially unwound canister.

The mode of payout for some applications is illustrated in FIG. 3. Although the canister is wound in the manner indicated in FIG. 1, the payout may be generally parallel to the axis of the cylinder 16. The use of a slightly tapered cylindrical configuration aids in the payout. As illustrated at numeral 38, during payout the adhesive is continuously parted between successive turns of fiber 12, and between overlying layers. If the adhesive is too weak, multiple turns can pay out at once, causing snarls and possible fracture of the fiber 12. If the adhesive at numeral 38 becomes brittle or otherwise changes its adhesive properties significantly during storage, or is present unevenly between the fibers, the payout of the fiber 12 is interrupted. The result can be a damaged or broken fiber.

It is apparent that the nature of the adhesive, and its ability to retain desirable adhesive properties during extended storage periods after application, is critical to the successful achieving and retention of a uniform fiber pack and the ability to unwind the fiber from the canister without damage or breaking of the fiber. The prior neoprene adhesive has a relatively high glass transition temperature so that it may become brittle during storage. Neoprene adhesive may oxidize at moderately elevated temperatures of 50°-60° C., again leading to embrittlement. Also, the methylethyl ketone solvent used with neoprene adhesive evaporates very rapidly, without permitting time for adjustment of the fiber in the fiber pack, and is believed to cause reduced optical transmission of the optical fiber.

The preferred adhesive of the invention is formed by mixing together about 25 percent by weight of 3,3,3-trifluoropropylmethylsiloxane, a fluorosilicone, and about 75 percent by weight of a polydimethylsiloxane of the general form

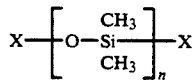

and end groups X of any acceptable type, such as, for example, $Si(CH_3)_3$ or $Si(OH)_3$. The value of n may vary, but is normally greater than 10.

The fluorosilicone is available commercially from Dow Corning as Type 94-003, which has about 55 percent by weight solids. The polydimethylsiloxane is available commercially from General Electric as Type GE6573PSA, which also has about 55 percent by weight solids. Although these materials, and the carrier medium, are available commercially, there has been no recognition of the properties and benefits available when using the particular combination in fiber optic canister systems.

Increasing the relative proportion of the fluorosilicone increases the lubricity of the adhesive, and decreasing the relative proportion of the fluorosilicone increases the tackiness. It has been found that the use of 25 percent of the fluorosilicone provides the best mix of these two properties. However, different proportions are also operable, and may find use in different configurations of canisters. Tests of adhesives ranging from entirely fluorosilicone to entirely polydimethylsiloxane have been conducted successfully, and adhesives over this range are expected to have utility in other optical fiber payout applications.

The fluorosilicone and the polydimethylsiloxane are mixed together, and then dissolved in an appropriate carrier medium. The medium may act in part as a solvent or as a means for moving a dispersion, but in either case serves to put the adhesive in a diluted form that can be readily delivered to the fibers. The preferred carriers are 1,1,2-trichloro-1,2,2-trifluoroethane, available commercially as Freon TF, 1,1,1-trichloroethane, known in the industry as TCA, or a mixture of the two. Mixtures of the Freon TF and TCA ranging from all Freon TF to all TCA have been tested and found operable in practicing the invention. These carriers do not evaporate immediately, but retain their liquidity for a time after application. This lubricity permits the fiber pack to adjust itself to remove small winding imperfections before the adhesive hardens fully. Little manual massaging of the fiber pack is required to compact the fiber pack using the present adhesive, while extensive massaging was required using the prior neoprene adhesive.

The ratio of the adhesive to the carrier is adjusted to allow delivery of an operable amount of the adhesive by the pressure-less die technique described earlier, and a 5 percent by weight/volume (diluted as necessary) concentration of the adhesive in the carrier has been found effective for this purpose.

The adhesive of the invention has a glass transition temperature sufficiently low to permit storage of the wound canister at temperatures of down to about $-50°$ C. without loss of adhesive properties. The adhesive does not embrittle at moderately elevated temperatures, or during thermal cycling between low and high temperatures.

The use of the silicone-based adhesive of the present invention has the entirely unexpected benefit of reducing the loss of light energy along the length of the optical fiber in some instances, as compared with the use of the prior neoprene adhesive. For some types of optical fibers, the attenuation of light was so great with the neoprene adhesive that no light at all could be conveyed through an 11 kilometer long fiber using conventional neoprene adhesive, but transmission was possible using the silicone-based adhesive of the invention. Three different types of optical fibers were quantitatively compared for light transmission using conventional neoprene adhesive and the present adhesive. For one type of fiber, there was a 10-fold increase in light transmission using the present adhesive. For a second type of fiber, there was a 33 percent increase in light transmission using the present adhesive. For a third type of fiber, light transmission was essentially the same for both types of adhesive. Thus, for two of three types of fiber evaluated, there was a significant improvement in light transmission using the present adhesive as compared with the prior neoprene adhesive.

The improved optical performance of the fibers attained using the present adhesive is, at least in part, due to the solvents used for the two adhesives. The neoprene adhesive is dissolved in a major fraction of methylethylketone (MEK) for application. It is believed that the MEK can degrade the polymer buffer material that is deposited upon the fibers for protection, reducing the protection of the fibers and increasing the likelihood of flaws that compromise the properties of the fiber.

The approach of the present invention thus provides a significant advance in the practical utilization of optical fibers that are supported as canisters on bobbins, and paid out before or during use. Not only are the mechanical properties better, but the adhesive of the invention also results in improved optical properties. Although a particular embodiment of the invention has been described in detail for purposes of illustration, various modifications may be made without departing from the spirit and scope of the invention. Accordingly, the invention is not to be limited except as by the appended claims.

What is claimed is:

1. A process for removably fixing optical fibers onto a payout support, comprising the steps of:
    applying an optical fiber onto a payout support; and
    depositing over the optical fiber an adhesive selected from the group consisting of a fluorosilicone, a polydimethylsiloxane, and mixtures thereof, in a liquid carrier.

2. The process of claim 1, wherein the support has the shape of a tapered cylinder.

3. The process of claim 1, wherein the fluorosilicone and the polydimethylsiloxane are present in a mixture, and the fluorosilicone is about 25 percent by weight of the mixture.

4. The process of claim 1, wherein the fluorosilicone is 3,3,3-trifluoropropylmethylsiloxane.

5. The process of claim 1, wherein the weight ratio of the adhesive to the carrier is about 5 parts adhesive to 95 parts carrier.

6. The process of claim 1, wherein the carrier is selected from the group consisting of 1,1,2-trichloro-1,2,2-trifluoroethane and 1,1,1-trichloroethane.

7. The process of claim 1, wherein the step of depositing is conducted simultaneously with the step of applying.

8. The process of claim 1, wherein the step of depositing is accomplished by pressure-less die application of the adhesive to the fiber.

9. A process for removably fixing optical fibers onto a tapered cylindrical payout support, comprising the steps of:
    winding an optical fiber onto a tapered cylindrical payout support; and
    depositing over the optical fiber a mixture consisting essentially of about 5 percent by weight of an adhesive having about 25 percent by weight of 3,3,3-trifluoropropylmethylsiloxane and about 75 percent by weight of a polydimethylsiloxane, and about 95 percent by weight/volume of a carrier selected from the group consisting of 1,1,2-trichloro-1,2,2-trifluoroethane, 1,1,1-trichloroethane, and mixtures thereof, the step of depositing being conducted simultaneously with the step of winding.

10. The process of claim 9, wherein the step of depositing is accomplished by applying the mixture of adhesive and carrier to the optical fiber as it is being wound onto the payout support.

11. The process of claim 9, wherein the step of depositing is accomplished by pressure-less die application of the adhesive to the fiber.

* * * * *